(12) United States Patent
Mao et al.

(10) Patent No.: US 11,165,868 B2
(45) Date of Patent: Nov. 2, 2021

(54) SYSTEMS AND METHODS FOR ACHIEVING SESSION STICKINESS FOR STATEFUL CLOUD SERVICES WITH NON-STICKY LOAD BALANCERS

(71) Applicant: Microsoft Technology Licensing, LLC, Redmond, WA (US)

(72) Inventors: Weijia Mao, Seattle, WA (US); Mariyan Dimitrov Fransazov, Kirkland, WA (US); Yasser Elsayed Shaaban, Seattle, WA (US); David Nissimoff, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 318 days.

(21) Appl. No.: 15/474,366

(22) Filed: Mar. 30, 2017

(65) Prior Publication Data

US 2018/0288163 A1    Oct. 4, 2018

(51) Int. Cl.
*H04L 29/08* (2006.01)
*H04L 29/06* (2006.01)
(Continued)

(52) U.S. Cl.
CPC .............. *H04L 67/141* (2013.01); *G06F 9/54* (2013.01); *H04L 41/0654* (2013.01);
(Continued)

(58) Field of Classification Search
CPC .............. H04L 67/141; H04L 41/0654; H04L 67/02; H04L 67/1004; H04L 67/146;
(Continued)

(56) References Cited

U.S. PATENT DOCUMENTS 6,970,932 B1 * 11/2005 Juster ................ H04L 29/12113
709/203
7,016,964 B1 * 3/2006 Still .................... H04L 63/0281
709/203
(Continued)

FOREIGN PATENT DOCUMENTS

EP        2566135 A1    3/2013

OTHER PUBLICATIONS

"Elastic Load Balancing: Classic Load Balancers," Amazon Web Services, Inc., Aug. 11, 2016, 122 pages (pp. 75-79).
(Continued)

*Primary Examiner* — Dhairya A Patel
*Assistant Examiner* — Sujana Khakural
(74) *Attorney, Agent, or Firm* — Ray Quinney & Nebeker P.C; James Bollugh (57) ABSTRACT

Systems and methods are provided and include a processor, memory, and an application that is stored in the memory and includes instructions. The instructions are configured to initiate a stateful session for the application by sending a session initiation request addressed to a global endpoint and receive a response to the session initiation request from a first server of a first server cluster, the response including a cluster identification associated with the first server cluster. The instructions are further configured to send a session request addressed to the global endpoint, the session request including the cluster identification associated with the first server cluster. The instructions are further configured to receive an error message in response to the session request from a second server of a second server cluster to resend the session request addressed to the first server cluster in response to receiving the error message.

22 Claims, 7 Drawing Sheets

(51) Int. Cl.
  *H04L 12/24* (2006.01)
  *G06F 9/54* (2006.01)
(52) U.S. Cl.
  CPC .......... *H04L 67/02* (2013.01); *H04L 67/1004* (2013.01); *H04L 67/146* (2013.01); *H04L 67/42* (2013.01)
(58) Field of Classification Search
  CPC ......... H04L 67/42; G06F 9/54; G06F 9/5033; G06F 2209/5016
  See application file for complete search history.

(56) References Cited

U.S. PATENT DOCUMENTS

| | | | |
|---|---|---|---|
| 8,370,467 B1* | 2/2013 | Sauer | H04L 69/02 709/217 |
| 8,458,298 B2* | 6/2013 | Josefsberg | H04L 41/0668 709/220 |
| 9,450,875 B1* | 9/2016 | Tong | G06F 11/203 |
| 2002/0103663 A1* | 8/2002 | Bankier | G06Q 20/02 709/224 |
| 2004/0243709 A1* | 12/2004 | Kalyanavarathan | G06F 9/5033 709/226 |
| 2005/0165885 A1* | 7/2005 | Wong | H04L 67/1002 709/201 |
| 2005/0198335 A1 | 9/2005 | Brown et al. | |
| 2007/0121490 A1* | 5/2007 | Iwakawa | H04L 67/1008 370/218 |
| 2007/0150602 A1* | 6/2007 | Yared | H04L 67/142 709/227 |
| 2008/0320003 A1* | 12/2008 | Heinson | H04L 29/12066 |
| 2010/0223364 A1 | 9/2010 | Wei | |
| 2011/0029587 A1* | 2/2011 | Fujii | G06F 16/1734 707/827 |
| 2013/0007518 A1* | 1/2013 | George | H04L 67/06 714/16 |
| 2016/0112500 A1* | 4/2016 | Kim | H04L 67/1031 709/226 |
| 2017/0195427 A1* | 7/2017 | Choquette | H04L 61/2007 |
| 2018/0253415 A1* | 9/2018 | Halai | G06F 21/602 |
| 2018/0270302 A1* | 9/2018 | Yang | H04L 67/1004 |

OTHER PUBLICATIONS

"WebSphere Application Server V6 Scalability and Performance Handbook", Retrieved From <<http://www.redbooks.ibm.com/redbooks/pdfs/sg246392.pdf>>, May 1, 2005, 340 Pages.

"International Search Report & Written Opinion Issued in PCT Application No. PCT/US18/022526", dated Jul. 3, 2018, 14 Pages.

* cited by examiner

SYSTEMS AND METHODS FOR ACHIEVING SESSION STICKINESS FOR STATEFUL CLOUD SERVICES WITH NON-STICKY LOAD BALANCERS

FIELD

The present disclosure relates to stateful cloud services, and more particularly to systems and methods for achieving session stickiness for stateful cloud services with non-sticky load balancers.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Stateful cloud services require a server computer that tracks and stores a current state of an application running on a client computer during a cloud services session. For example, web applications, including web authoring tools, can run within a web browser of a client computer that is in communication with a server computer. During the cloud services session, the server computer can provide code and content to the client computer to run the web application in the web browser of the client computer. For further example, an application design tool, such as PowerApps®, can be run within a web browser and used to create a mobile application, for example, for a mobile device. During an application design session, a user can drag user interface elements, such as sliders, buttons, and text, onto a blank canvas within the web browser to design and build a mobile application. While the web application is running on the client computer, such as in the web browser of the client computer, the client computer is in communication with the server computer to receive code and content for the web application based on user input received by the client computer. To function properly, the stored state information on the server computer must match the actual current state of the client computer. For example, the state of the web application running in the web browser of the client computer must be in sync with the stored state information on the server computer throughout the session.

To ensure that the stored state information on the server computer remains in sync with the current state of the web application on the client computer and to maintain continuous operation of the web application, communications from the web browser of the client computer must be routed to the same datacenter or server cluster to reach the same server computer that is storing the state information corresponding to the particular client computer throughout the session. When, however, communications from the web browser of the client computer are addressed to a global endpoint, instead of a particular server cluster, a load balancer may direct such communications to an incorrect server cluster. In such case, the stored state information on the server could become out of sync with the current state of the web application, resulting in an interruption or malfunction of the web application running in the web browser of the client computer.

SUMMARY

A system is provided and includes a processor, memory, and an application stored in the memory and including instructions, which are executable by the processor. The instructions are configured to initiate a stateful session for the application by sending a session initiation request addressed to a global endpoint associated with a plurality of server clusters. The instructions are further configured to receive a response to the session initiation request from a first server of a first server cluster of the plurality of server clusters, the response including a cluster identification associated with the first server cluster. The instructions are further configured to send a session request addressed to the global endpoint, the session request including the cluster identification associated with the first server cluster. The instructions are further configured to receive an error message in response to the session request from a second server of a second server cluster of the plurality of server clusters. The instructions are further configured to resend the session request addressed to the first server cluster in response to receiving the error message.

In other features, a server is provided that is associated with a first server cluster of a plurality of server clusters, the plurality of server clusters being associated with a global endpoint. The server includes a processor, memory, and an application stored in the memory and including instructions, which are executable by the processor. The instructions are configured to store a first cluster identification associated with the first server cluster. The instructions are further configured to receive a session initiation request from a client of a plurality of clients, the session initiation request being addressed to the global endpoint. The instructions are further configured to send a response to the session initiation request to the client, the response including the first cluster identification. The instructions are further configured to store session state information in the memory, the session state information corresponding to a state of a client application configured to run at the client. The instructions are further configured to receive a session request from one of the plurality of clients addressed to the global endpoint, the session request having a second cluster identification. The instructions are further configured to compare the first cluster identification with the second cluster identification. The instructions are further configured to respond to the session request with an error message when the first cluster identification does not match the second cluster identification.

In other features, a method is provided and includes initiating, with a client, a stateful session for an application by sending a session initiation request addressed to a global endpoint associated with a plurality of server clusters. The method further includes receiving, with the client, a response to the session initiation request from a first server of a first server cluster of the plurality of server clusters, the response including a cluster identification associated with the first server cluster. The method further includes sending, with the client, a session request addressed to the global endpoint, the session request including the cluster identification associated with the first server cluster. The method further includes receiving, with the client, an error message in response to the session request from a second server of a second server cluster of the plurality of server clusters. The method further includes resending, with the client, the session request addressed to the first server cluster in response to receiving the error message.

In other features, a method is provided and includes storing, with a server associated with a first server cluster of a plurality of server clusters associated with a global endpoint, a first cluster identification associated with the first server cluster. The method further includes receiving, with the server, a session initiation request from a client of a plurality of clients, the session initiation request being addressed to the global endpoint. The method further includes sending, with the server, a response to the session initiation request from the client, the response including the first cluster identification. The method further includes storing, with the server, session state information corresponding to a state of a client application configured to run at the client. The method further includes receiving, with the server, a session request from one of the plurality of clients addressed to the global endpoint, the session request having a second cluster identification. The method further includes comparing, with the server, the first cluster identification with the second cluster identification. The method further includes responding, with the server, to the session request with an error message when the first cluster identification does not match the second cluster identification.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

During a stateful cloud services session, requests from a client computer must continue to be routed to the same data center or server cluster to ensure that the requests are handled by the same server computer throughout the session. Such cloud services sessions are referred to as "sticky" sessions, meaning that requests from the client computer during the session are routed to the same server computer throughout the session. (For comparison, during a "non-sticky" session, requests can be handled during the session by different server computers, which could be in a different data center or server cluster.) In this way, during a sticky session, the stored state information on the particular server computer for the session can remain in sync with the actual current state of the client computer throughout the session. The client computer, for example, may be running a web application within a web browser. In such case, the web application running within the web browser of the client computer must remain in communication with the same server computer throughout the session to ensure that the stored state information on the server computer matches and remains in sync with the actual state of the client computer throughout the session.

When multiple server clusters are used, load balancers may distribute traffic amongst the server clusters based on traffic routing algorithms. For example, the multiple server clusters may be located at different datacenters and may be collectively addressable by a single global endpoint address. For example, the single global endpoint address can correspond to a particular Uniform Resource Locator (URL) address, such as, for example, "[domainname].com." The load balancer may direct requests addressed to the global endpoint address to different server clusters based on traffic routing factors and algorithms, such as location, bandwidth, current load and traffic, etc. Each of the individual server clusters may be addressable by a direct cluster endpoint address corresponding to a particular URL associated with the cluster. For example, a first cluster (cluster A) may have a direct cluster endpoint address such as "clusterA.[domainname].com" and a second cluster (cluster B) may have a direct cluster endpoint such as "clusterB.[domainname].com." The load balancer may then direct requests addressed to the global endpoint address "[domainname].com" to either cluster A at "clusterA.[domainname].com" or to cluster B at "clusterB.[domainname].com." While this example uses two individual server clusters—cluster A and cluster B—any number of server clusters located at any number of datacenters may be used. Further, the data centers and server clusters may be geographically dispersed. For example, a first server cluster may be located in an eastern geographic region of the United States, a second server cluster may be located in a western geographic region of the United States, a third server cluster may be located in Europe, and fourth server cluster may be located in Asia, etc.

Once a stateful session has started, subsequent requests during the session must be routed back to the same server cluster that started the session. In this way, the subsequent requests during the session can be routed to the same server computer, within the particular server cluster, that started the session. For example, a session identification (session ID) can be used to route a particular request to a particular server computer within the server cluster. Depending on the type of load balancer being used, however, requests to the global endpoint address may be routed by the load balancer to a server cluster that is different from the server cluster that started the session. For example, a sticky load balancer or a non-sticky load balancer can be used. A sticky load balancer, for example, can store information that associates a particular session or a particular client computer with a particular server cluster and can then route requests associated with that particular session or from that particular client computer to the same server cluster throughout the session. In this way, a sticky load balancer can ensure that requests during a cloud services session are routed to the same server cluster throughout the session so that a particular request addressed to a global endpoint address during a stateful session is routed to the correct server cluster for that particular session. As such, sticky load balancers require additional programming and processing of each request to direct the requests to the correct server clusters. A non-sticky load balancer, on the other hand, does not store such information associating a particular session or a particular client computer with a particular server cluster. As such, when a non-sticky load balancer is used, requests to the global endpoint address are routed based on traffic routing algorithms and not based on session or client computer information.

Traditionally, when non-sticky load balancers are used, to ensure that requests from the client computer during a stateful session are directed to the correct server cluster, the client computer will specifically address requests to the correct direct cluster endpoint. In other words, once the session is initiated, the client computer addresses subsequent requests during the session to the particular server cluster that initiated the session. Continuing with the previous example, the subsequent session requests could be addressed directly to "clusterA.[domainname].com" or to "clusterB.[domainname].com." In this way, the subsequent requests will be routed to the correct server cluster that initiated the session. Because the session originated with a request addressed to the global endpoint address, subsequent requests addressed directly to the particular clusters are treated as cross-origin requests, i.e., requests to a domain outside of the domain from which the original request was served. Under the cross-origin resource sharing (CORS) standard, when the session requests are from a web browser of the client computer, such cross-origin requests require a pre-flight request to the outside domain to confirm that it is safe to make the request to the outside domain. In this way, each subsequent request addressed directly to a particular server cluster can result in two requests being made—first the CORS pre-flight request and then the actual request. For this reason, addressing subsequent requests during a stateful session directly to a particular server cluster can double the amount of requests, increase latency, decrease available bandwidth, increase delays, and, ultimately, decrease the speed of the web application running in the web browser of the client computer. The CORS standard is implemented by many modern browsers and is a recommended standard of the World Wide Web Consortium (W3C®).

To address the above issues, the present disclosure provides systems and methods for achieving session stickiness for stateful cloud services with non-sticky load balancers. As described in further detail below, in the systems and methods of the present disclosure, once a stateful session is initiated, the particular server computer that initiated the session responds to the client computer by sending a cluster identification (cluster ID) associated with the direct cluster endpoint corresponding to the particular server and/or by sending the direct cluster endpoint address itself in the response to the client computer. In some implementations, the cluster ID can be the same as the direct cluster endpoint address, in which case only a single value is returned to the client. The particular server computer can send the cluster ID and/or the direct cluster endpoint address in the header of the Hypertext Transfer Protocol (HTTP) response to the client computer or in the body of the HTTP response to the client computer. The client computer then proceeds with the session by continuing to address requests to the global endpoint address. Each request, however, also includes the cluster ID and/or the direct cluster endpoint address in the header or body of the HTTP request. The server computer then analyzes the cluster ID and/or direct cluster endpoint address included in the HTTP request to verify whether the cluster ID and/or direct cluster endpoint address matches the cluster ID and/or direct cluster endpoint address of the particular server cluster of the server computer responding to the request. When the cluster ID and/or direct cluster endpoint address matches, the request has been properly routed to the correct server cluster. In such case, the non-sticky load balancer has directed the subsequent session request back to the same server cluster that initiated the session. The session then continues on in this manner with the client continuing to address subsequent session requests to the global endpoint. In the event the server computer receives a session request with a cluster ID and/or direct cluster endpoint address that does not match the cluster ID and/or direct cluster endpoint address of the server cluster of the server computer, then a cluster mismatch has occurred. In other words, the non-sticky load balancer has directed a session request to a server cluster that is different than the server cluster that initiated the session. The server computer then responds to the request with a cluster mismatch error message. In such case, the client computer retries the failed request due to the cluster mismatch error, except addresses the request this time to the direct cluster endpoint address instead of the global endpoint address. Alternatively, in the case of a cluster mismatch, the server computer can extract the cluster ID and/or direct cluster endpoint address from the request, forward the request to the correct server cluster using the cluster ID and/or direct cluster endpoint address, and then notify the client computer that the previous request was routed to the incorrect server cluster. In either case, the client computer then addresses subsequent requests during the session to the direct cluster endpoint address instead of the global endpoint address. As noted above, such requests are treated as cross-origin requests and require a CORS pre-flight request.

In the systems and methods of the present disclosure, once a session is initiated, the client computer continues to address session requests to the global endpoint address until a particular request is routed to the incorrect server cluster. In this way, for web browsers and web applications running in web browsers, the systems and methods of the present disclosure avoid and/or delay for as long as possible the performance penalty of having to utilize CORS pre-flight requests until a request is incorrectly routed. Put another way, the systems and methods of the present disclosure minimize the performance penalty of having to utilize CORS pre-flight requests by avoiding and/or delaying the use of CORS pre-flight requests for as long as possible. In the case where requests from the client computer continue to be routed to the correct server cluster, the client computer will continue to address its requests to the global endpoint. Once a cluster mismatch occurs and a request is directed to an incorrect server cluster, then the client computer will begin to address session requests to the direct cluster endpoint and incur the performance penalty of the CORS pre-flight requests. As discussed in further detail below, the client computer may address session requests to the direct cluster endpoint for the remainder of the session. Alternatively, the client computer may only address session requests to the direct cluster endpoint for a predetermined period of time or for a predetermined number of requests. Alternatively, the client computer may only retry the current request by addressing it to the direct cluster endpoint and may then immediately begin to address session requests to the global endpoint address again.

Figure 1:
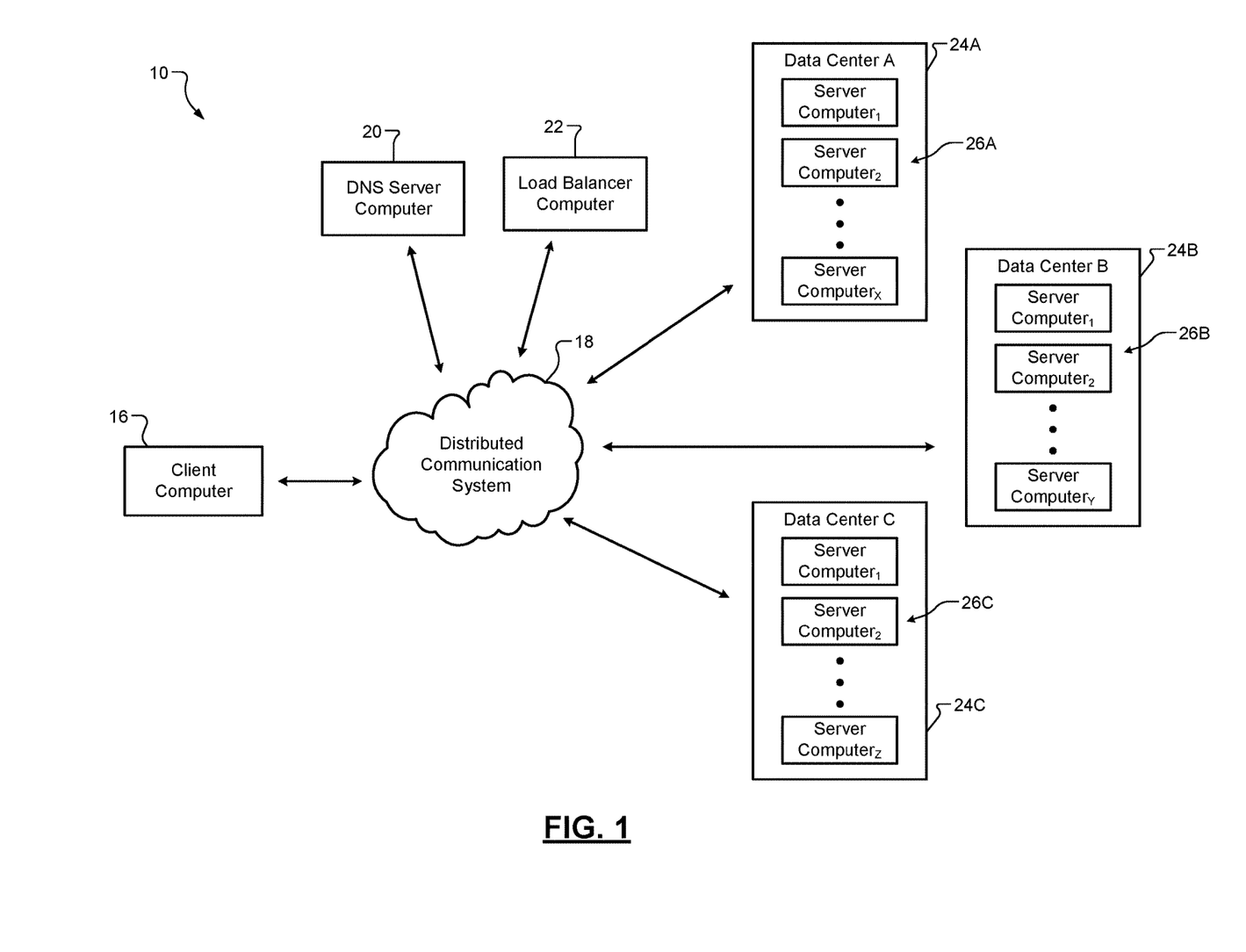
FIG. 1 is a functional block diagram of an example of a stateful cloud services system in accordance with an embodiment of the present disclosure.

With reference to FIG. 1, a stateful cloud services system 10 includes: a client computer 16; a distributed communication system 18; a Domain Name System (DNS) server computer 20; a non-sticky load balancer computer 22; and multiple data centers 24A, 24B, 24C. While the example of FIG. 1 includes three data centers 24A, 24B, 24C, any number of data centers can be used. The data centers 24A, 24B, 24C include server clusters 26A, 26B, 26C, respectively. The server clusters 26A, 26B, 26C are comprised of individual server computers. For example, data center A 24A includes server cluster 26A with server computers labeled server computer$_1$ to server computer$_X$; data center B 24B includes server cluster 26B with server computers labeled server computer₁ to server computer_Y; and data center C 24C includes server cluster 26C with server computers labeled server computer₁ to server computer_Z.

As discussed above, the server clusters 26A, 26B, 26C may be associated with, and collectively addressed by, a global endpoint address, such as "[domainname].com." Further, the individual server clusters 26A, 26B, 26C may each be associated with a corresponding direct cluster endpoint address. For example, server cluster 26A may be associated with the direct cluster endpoint address "clusterA.[domainname].com"; server cluster 26B may be associated with the direct cluster endpoint address "clusterB.[domainname].com"; and server cluster 26C may be associated with the direct cluster endpoint address "clusterC.[domainname].com."

The distributed communication system 18 includes routers, which direct packets between the client computer 16, the server clusters 26A, 26B, 26C, the DNS server computer 20, and the non-sticky load balancer computer 22. The distributed communication system 18 may include a network, such as the Internet, a local area network (LAN), a wireless local area network (WLAN), and/or a wide area network (WAN) such as the Internet.

When the client computer 16 issues a request addressed to the global endpoint address, the DNS server computer 20 and the non-sticky load balancer computer 22 may direct the request to one of the individual server clusters 26A, 26B, 26C. For example, the client computer 16 first sends a DNS query to the DNS server computer 20 to resolve the global endpoint address, e.g., "[domainname].com." The DNS server computer 20, for example, includes a data storage that stores Internet Protocol (IP) address-URL mapping records. The IP address-URL mapping records map URLs to IP addresses. In this case, because a non-sticky load balancer computer 22 is used for the global endpoint address, the global endpoint address is mapped to the non-sticky load balancer computer 22. For recursive DNS queries, for example, the DNS server computer 20 then contacts the non-sticky load balancer computer 22 to resolve the global endpoint address. For example, the non-sticky load balancer computer 22 may be implemented using Azure® Traffic Manager. The non-sticky load balancer computer 22 then selects one of the server clusters 26A, 26B, 26C, based on traffic routing factors and algorithms, and returns the address of the selected server cluster to the DNS server computer 20. The non-sticky load balancer computer 22 may, for example, select the particular server cluster based on the state of each of the server clusters 26A, 26B, 26C, based on the location of the server clusters 26A, 26B, 26C, based on the current amount of requests and traffic being handled by each of the server clusters 26A, 26B, 26C, and based on a chosen traffic-routing method. The DNS server computer 20 then returns the IP address for the selected server cluster to the client computer 16 and the client computer 16 sends the request based on the returned IP address for the selected server cluster. Alternatively, the DNS server computer 20 may receive the initial DNS query from the client computer 16 and respond to the client computer 16 with instructions on how to contact the non-sticky load balancer computer 22. The client computer 16 may then contact the non-sticky load balancer computer 22 and the non-sticky load balancer computer 22 may then provide the IP address for a selected server cluster directly to the client computer 16. On the other hand, when the client computer 16 sends a request addressed to a direct cluster endpoint, the client computer 16 may first contact the DNS server computer 20, which may simply return the IP address associated with the particular direct cluster endpoint. Again, the client computer 16 may then send the request based on the returned IP address for the direct cluster endpoint. Further, while the present example includes a non-sticky load balancer computer 22 operating with a DNS server computer 20, the teachings of the present disclosure are also applicable to other non-sticky load balancers, including, for example, non-sticky load balancers operating at the transport layer or the application layer of the Open Systems Interconnection (OSI) model of the Open System Interconnection project of the International Organization for Standardization (ISO), maintained by identification ISO/IEC 7498-1.

Figure 2:
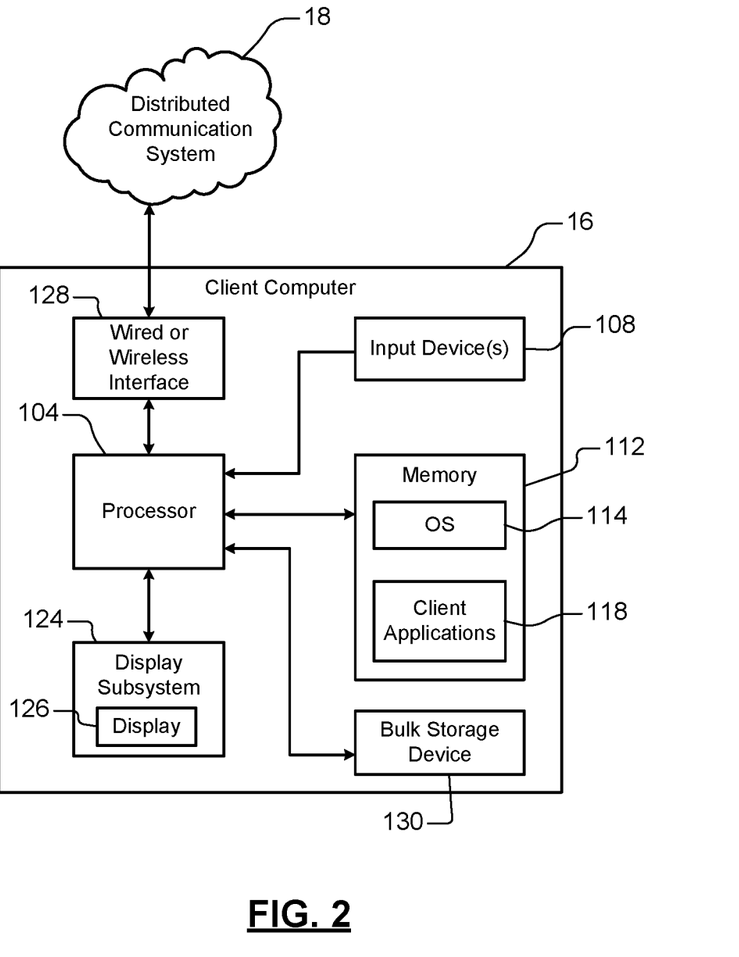
FIG. 2 a functional block diagram of an example of a client computer in accordance with an embodiment of the present disclosure.

In FIG. 2, a simplified example of a client computer 16 is shown. The client computer 16 includes a central processing unit (CPU) or processor 104 and an input device 108 such as a keypad, touchpad, mouse, etc. The client computer 16 further includes memory 112 such as volatile or nonvolatile memory, cache, or other type of memory. The client computer 16 further includes a bulk storage device 130 such as flash memory, a hard disk drive (HDD) or other bulk storage device.

The processor 104 of the client computer 16 executes an operating system (OS) 114 and one or more applications 118. For example, the applications 118 may include a web browser and a web application running in the web browser. The client computer 16 further includes a wired interface (such as an Ethernet interface) and/or wireless interface (such as a Wi-Fi, Bluetooth, near field communication (NFC) or other wireless interface (collectively identified at 128)) that can establish a communication channel over the distributed communication system 18. The client computer 16 further includes a display subsystem 124 including a display 126.

Figure 3:
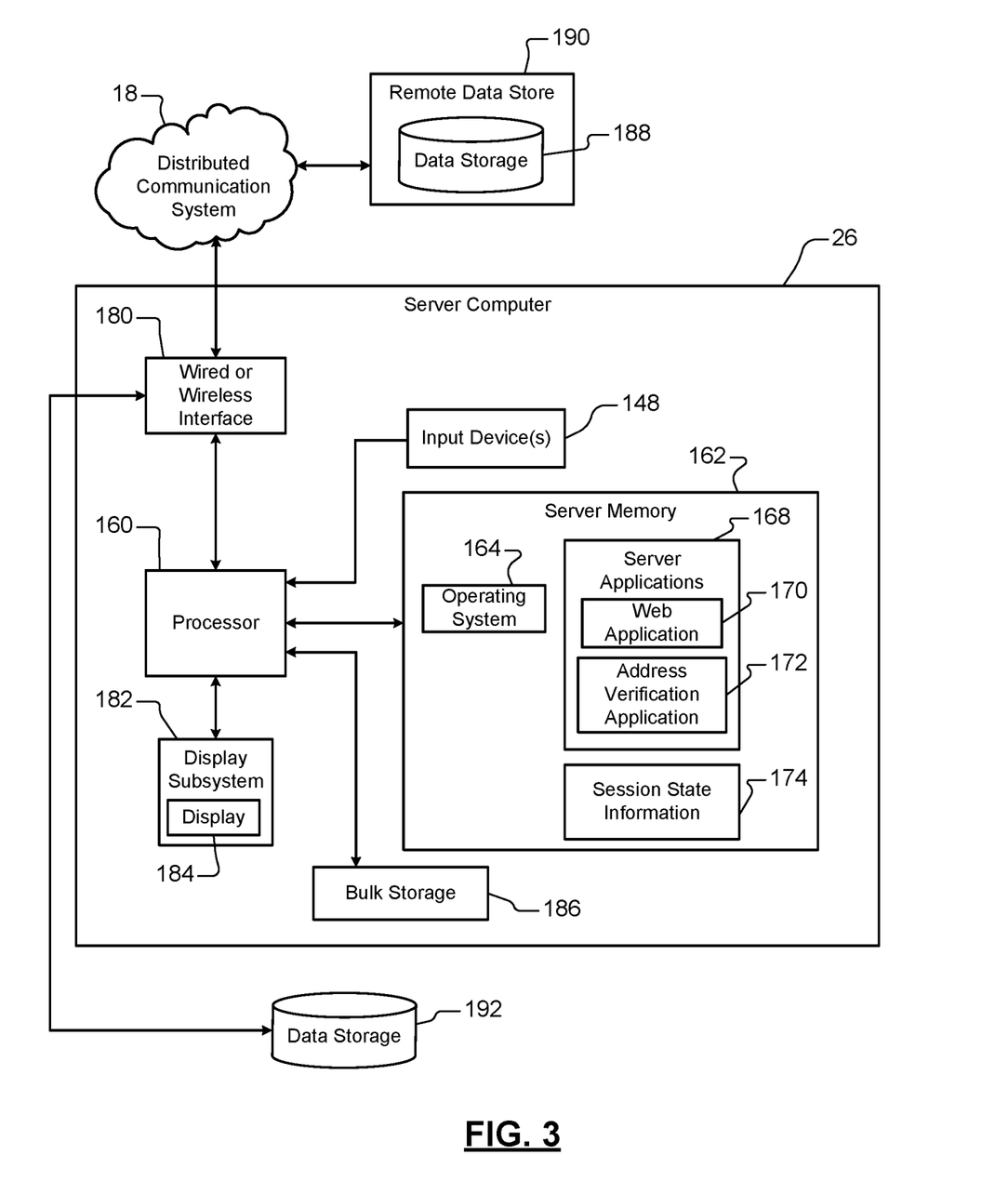
FIG. 3 is a functional block diagram of an example of a server computer incorporating applications in accordance with an embodiment of the present disclosure.

In FIG. 3, an example of a server computer 26 is shown. The server clusters 26A, 26B, 26C can each include server computers corresponding to the server computer 26. In addition, the DNS server computer 20 and the non-sticky load balancer computer 22 may be implemented with computers such as the server computer 26 shown in FIG. 3. The server computer 26 includes one or more processors 160 and an input device 148 such as a keypad, touchpad, mouse, etc. The server computer 26 further includes server memory 162 such as volatile or nonvolatile memory, cache, or other type of memory. The processor 160 executes an operating system (OS) 164 and one or more server applications 168. An example of a server application 168 includes a web application 170 that provides code and content to a web browser of a client computer 16. For example, the web application 170 may include server code for the server computer 26 to run a server side of the web application 170. The server computer 26 may provide client code to a client computer 16 to execute a client side of the web application 170 in the web browser of the client computer 16. Another example of a server application 168 includes an address verification application for verifying whether a cluster ID included in a request from a client computer 16 corresponds to a particular server cluster associated with the particular server computer 26, as described in further detail below with reference to FIG. 6. The server memory 162 also stores session state information 174 corresponding to the current state of a client computer 16 running the client side of the web application 170.

The server computer 26 further includes a wired or wireless interface 180 that establishes a communication channel over the distributed communication system 18. The server computer 26 further includes a display subsystem 182 that includes a display 184. The server computer 26 may further include a bulk storage device 186 such as flash memory, a hard disk drive (HDD), or other local or remote storage device. The processor 160 may also access a remote data storage 188 of a remote data store 190 via the interface 180 and the distributed communication system 18, or a data storage 192, such as a database, via the interface 180.

Figure 4:
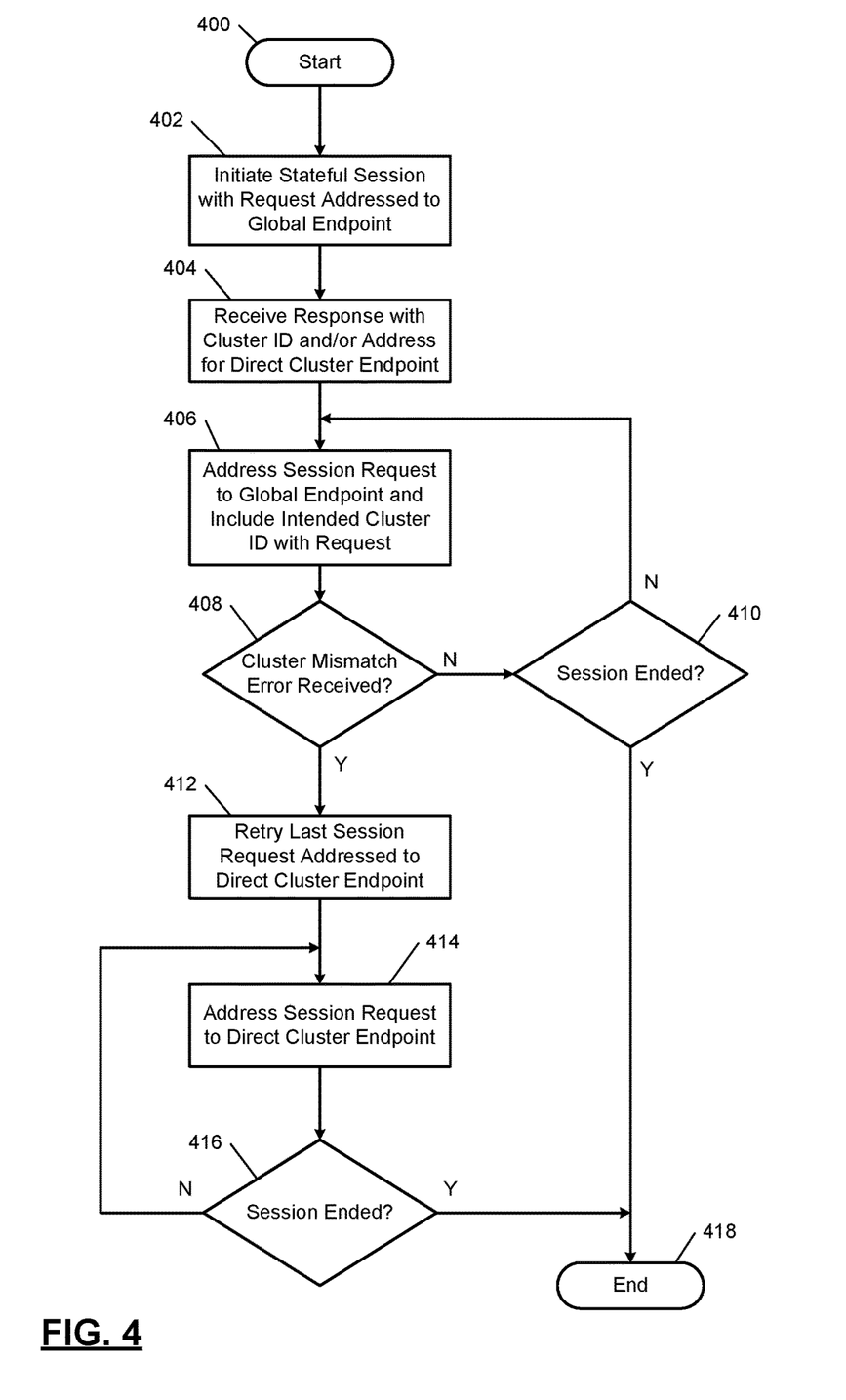
FIG. 4 illustrates a stateful cloud services method in accordance with an embodiment of the present disclosure.

Operations of the client computer 16, DNS server computer 20, non-sticky load balancer computer 22, and the server clusters 26A, 26B, 26C of FIGS. 1-3 are further described below with respect to the methods of FIGS. 4-6 and the timing diagram of FIG. 7. An example of a stateful cloud services method is illustrated in FIG. 4. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 4 is executed by the client computer 16 and begins at 400. At 402, the client computer 16 initiates a stateful session with a request addressed to a global endpoint. For example, the client computer 16 may initiate the stateful session to run a web application in the web browser of the client computer. For example, the web application may be a web authoring tool that runs within the web browser of the client computer 16. For further example, the web application may be a mobile application building tool, such as Power-Apps®. Other applicable stateful web applications, however, may be run in the web browser of the client computer. Additionally, while the example of a web application running in a web browser is used for illustration, the present teachings are also applicable to a client application running on the client computer outside of a web browser. As discussed above, and in further detail below, the initial request addressed to the global endpoint is routed to one of the server clusters 26A, 26B, 26C.

At 404, the client computer 16 receives a response to the initial request from a server computer 26 of one of the server clusters. The response to the initial request can include content and code for running the web application or the client application on the client computer 16. In addition, the response includes a cluster ID and/or the direct cluster endpoint address associated with the direct cluster endpoint that includes the server computer 26 that responded to the initial request. As noted above, in some implementations, the cluster ID can be the same as the direct cluster endpoint address, in which case only a single value is returned in the response to the client.

At 406, the client computer 16 proceeds with running the web application and, during the now initiated session, sends a session request as part of the session addressed to the global endpoint. The session request includes the intended cluster ID as a field within the HTTP header of the request. Alternatively, the session request can include the intended cluster ID within the HTTP message body. The intended cluster ID corresponds to the cluster ID received by the client computer at step 404. As discussed above, and in further detail below, the session request is directed by the non-sticky load balancer computer 22 to one of the server clusters 26A, 26B, 26C. As further discussed above, and in further detail below, the particular server of the server cluster that receives the session request retrieves the cluster ID from the HTTP header of the request and verifies whether the cluster ID matches the direct cluster endpoint associated with the particular server responding to the session request. As further discussed above, and in further detail below, when the cluster ID does not match the direct cluster endpoint associated with the particular server computer responding to the session request, the particular server computer issues a cluster mismatch error.

At 408, the client computer 16 determines whether a cluster mismatch error has been received from a server computer 26 in response to the previous session request sent at step 406. As described in further detail below, the cluster mismatch error may be a predetermined HTTP error code. For example, the systems and methods of the present disclosure may utilize a predetermined HTTP status code that is recognized by the systems and methods of the present disclosure as corresponding to a cluster mismatch error. For example, HTTP status code 417 may be designated as corresponding to the cluster mismatch error. When the cluster mismatch error has not been received at 408, the client computer 16 proceeds to 410 and determines whether the session has ended. When the session has not ended at 410, the client computer 16 loops back to 406 and continues with running the web application and with sending the next session request addressed to the global endpoint at 406. The client computer 16 continues in this manner until either a cluster mismatch error is received at 408 or the client computer 16 determines that the session has ended at 410. At 410, when the session has ended, the client computer 16 proceeds to 418 and the method ends.

At 408, when the client computer 16 receives a cluster mismatch error, the client computer 16 proceeds to 412. At 412, the client computer 16 retries the last session request except this time the client computer 16 addresses the session request to the direct cluster endpoint associated with the previously received cluster ID from step 404. For example, if the client computer 16 previously received the address for the direct cluster endpoint at step 404 and/or if the cluster ID and the direct cluster endpoint address are the same, the client computer 16 can use the direct cluster endpoint address to retry the last session request. If the client computer 16 only has the cluster ID for the direct cluster endpoint, the client computer 16 must obtain the direct cluster endpoint address using the cluster ID. For example, the client computer 16 may include a lookup table that provides direct cluster endpoint addresses for various cluster IDs. Alternatively, the client computer 16 may send a request addressed to the global endpoint requested the address for the direct cluster endpoint associated with the particular cluster ID. As an additional alternative, the cluster mismatch error may include the address for the direct cluster endpoint associated with the cluster ID included in the misrouted session request. In such case, all of the server clusters 26A, 26B, 26C can store the direct cluster endpoint addresses and associated cluster IDs. Once the address for the direct cluster endpoint is determined, the client computer 16 proceeds with retrying the last session request addressed to the direct cluster endpoint. As discussed above, because the client computer is now issuing a request to a domain address outside of the originating domain, i.e., the global endpoint, a CORS pre-flight request must now be made, in accordance with the CORS standard. In other words, at 412, the web browser of the client computer 16 issues a CORS pre-flight request to the direct cluster endpoint to confirm that it is safe to send the cross-origin request. Once the confirmation is received from the direct cluster endpoint, the client computer 16 then resends the actual request addressed to the direct cluster endpoint. The client computer 16 then proceeds to 414.

At 414, the client computer 16 proceeds with running the web application and sends session requests addressed to the direct cluster endpoint associated with the previously received cluster ID from step 404. Because the session requests sent at 414 are addressed to the direct cluster endpoint, the session request may or may not include the cluster ID. Again, each session request issued at 414 is preceded by a CORS pre-flight request to the direct cluster endpoint to confirm that it is safe to send the cross-origin request. The client computer 16 then proceeds to 416 and determines whether the session has ended. For example, a user of the client computer 16 may end the session at 416 (or at 410) by selecting a close or end option within the web application or by, for example, closing the web browser or the particular tab of the web browser that is running the web application. At 416, when the session has ended, the client computer proceeds to 418.

At 416, when the session has not ended, the client computer 16 loops back to 414 and continues to run the web application and issue session requests addressed to the direct cluster endpoint. The client computer 16 continues in this manner until the session ends at 416 and 418.

In the example of FIG. 4, once the cluster mismatch error is received at 408, the client computer 16 then proceeds to address all subsequent session requests to the direct cluster endpoint. Alternatively, as discussed above, the client computer 16 may only address session requests to the direct cluster endpoint for a predetermined period of time or for a predetermined number of requests. For example, the predetermined time period may be five minutes, ten minutes, or any other suitable time period. For further example, the predetermined number of requests may be 10 requests, 20 requests, or any other suitable number of requests. Alternatively, the client computer may only retry the current request by addressing it to the direct cluster endpoint and may then immediately begin to address session requests to the global endpoint address again.

Figure 5:
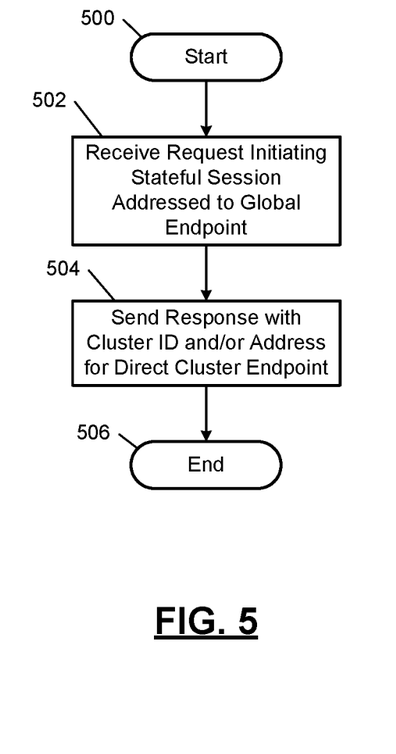
FIG. 5 illustrates a stateful cloud services method in accordance with an embodiment of the present disclosure.

Another example of a stateful cloud services method is illustrated in FIG. 5. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 5 is executed by a server computer 26 and begins at 500. At 502, the server computer 26 receives a request initiating a stateful session. The request is addressed to the global endpoint. As discussed above, the client computer 16 may initiate the stateful session to run a web application in the web browser of the client computer. For example, the web application may be a web authoring tool that runs within the web browser of the client computer 16. For further example, the web application may be a mobile application building tool, such as PowerApps®. Other applicable stateful web applications, however, may be run in the web browser of the client computer.

At 504, the server computer 26 sends a response to the initial request back to the client computer 16. The response to the initial request can include content and code for running the web application. In addition, the response includes a cluster ID and/or the direct cluster endpoint address associated with the direct cluster endpoint that includes the server computer 26 that is responding to the initial request. As noted above, in some implementations, the cluster ID can be the same as the direct cluster endpoint address, in which case only a single value is returned in the response to the client.

At 506, with the session now initiated, the method ends.

Figure 6:
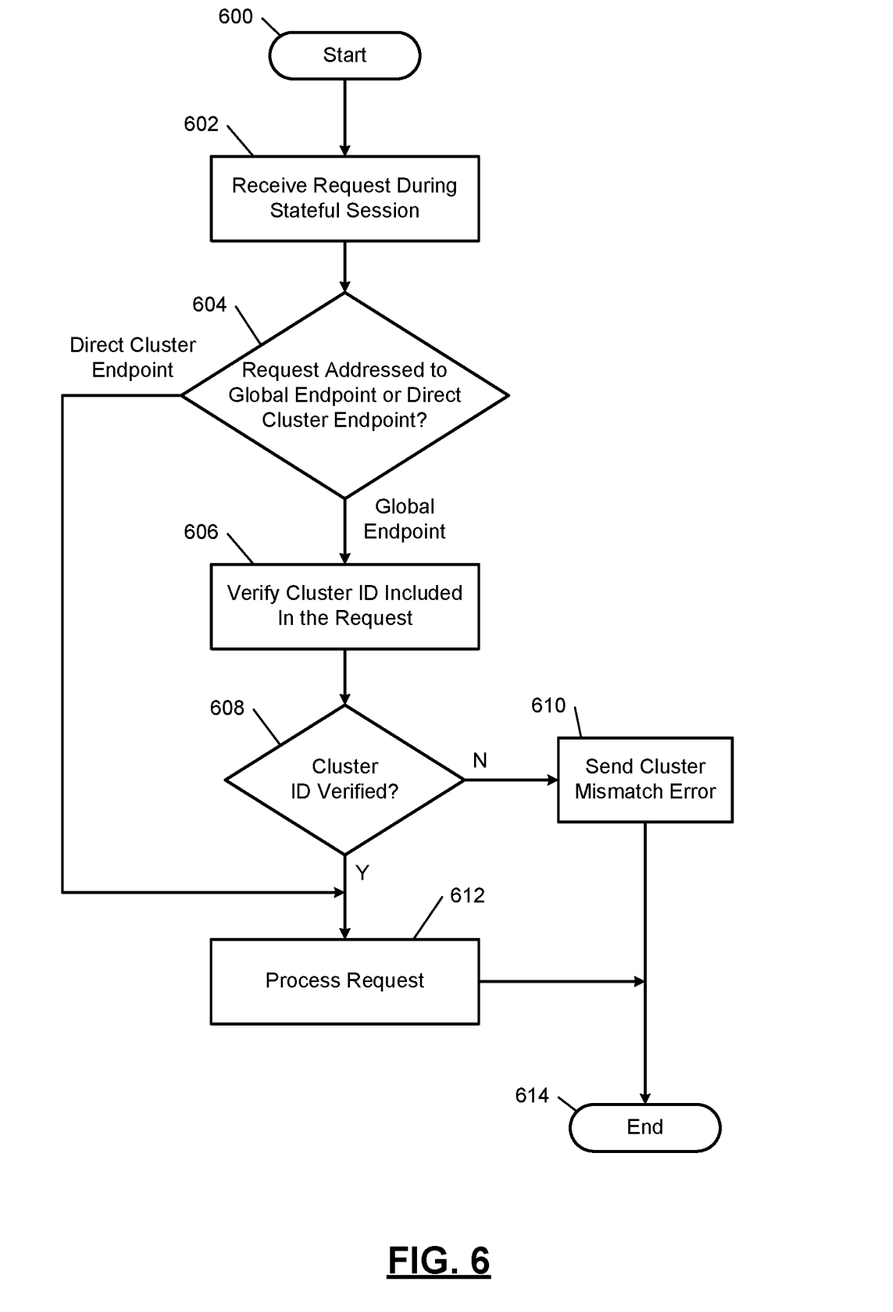
FIG. 6 illustrates a stateful cloud services method in accordance with an embodiment of the present disclosure.

Another example of a stateful cloud services method is illustrated in FIG. 6. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 6 is executed by a server computer 26 and begins at 600. At 602, the server computer 26 receives a request during the stateful session. For example, the session request received at 602 may be generated by the web browser of the client computer 16 while running the web application.

At 604, the server computer 26 determines whether the session request is addressed to the global endpoint or to a direct cluster endpoint. At 604, when the session request is addressed to the direct cluster endpoint, the server computer 26 proceeds to 612 and processes the request, as discussed in further detail below. At 604, when the session request is addressed to the global endpoint, the server computer 26 proceeds to 606. Alternatively, if all session requests include a cluster ID, including session requests addressed to the direct cluster endpoint, then step 604 can be omitted. In such case, the server computer 26 can proceed from 602 directly to 606 to verify the cluster ID included in the session request. In such case, step 604 can be omitted and all received session requests are verified at step 606. Further, in such case, with all session requests being verified at step 606, the server computer 26 does not jump directly to step 612 to process the request.

At 606, the server computer 26 extracts the cluster ID included in the HTTP header of the request, as discussed in detail above. In addition, the server computer 26 verifies the extracted cluster ID by comparing the extracted cluster ID with the cluster ID associated with the server cluster of the particular server computer 26. The server computer 26 then proceeds to 608. At 608, the server computer 26 determines whether the extracted cluster ID was verified, i.e., whether the extracted cluster ID matches the cluster ID associated with the server cluster of the particular server computer 26. At 608, when the two do not match, the server computer 26 proceeds to 610 and issues a cluster mismatch error. As discussed above, the server computer 26 may use HTTP error code 417 to designate the cluster mismatch error. Additionally, as mentioned above, the cluster mismatch error message may include the address for the direct cluster endpoint associated with the cluster ID that was included in the received session request. The server computer 26 then proceeds to 614 and the method ends.

At 608, when the extracted cluster ID is verified as matching the cluster ID associated with the server cluster of the particular server computer 26, the server computer 26 proceeds to 612 and processes the request. For example, at 612 the server computer 26 may perform processing associated with the web application and may send content or additional code back to the client computer 16, as appropriate. Additionally, the server computer 26 may update the session state information 174 in the server memory 162 (shown in FIG. 3) of the server computer 26, based on the processing performed in step 612. In the event the session associated with the session request is being handled by another server computer in the particular server cluster, the server computer may forward the session request to the appropriate server computer in the server cluster for processing there. Once the processing at 612 is complete, the server computer 26 proceeds to 614 and ends.

The method illustrated in FIG. 6 is repeatedly performed each time a session request is received by the server computer 26.

Figure 7:
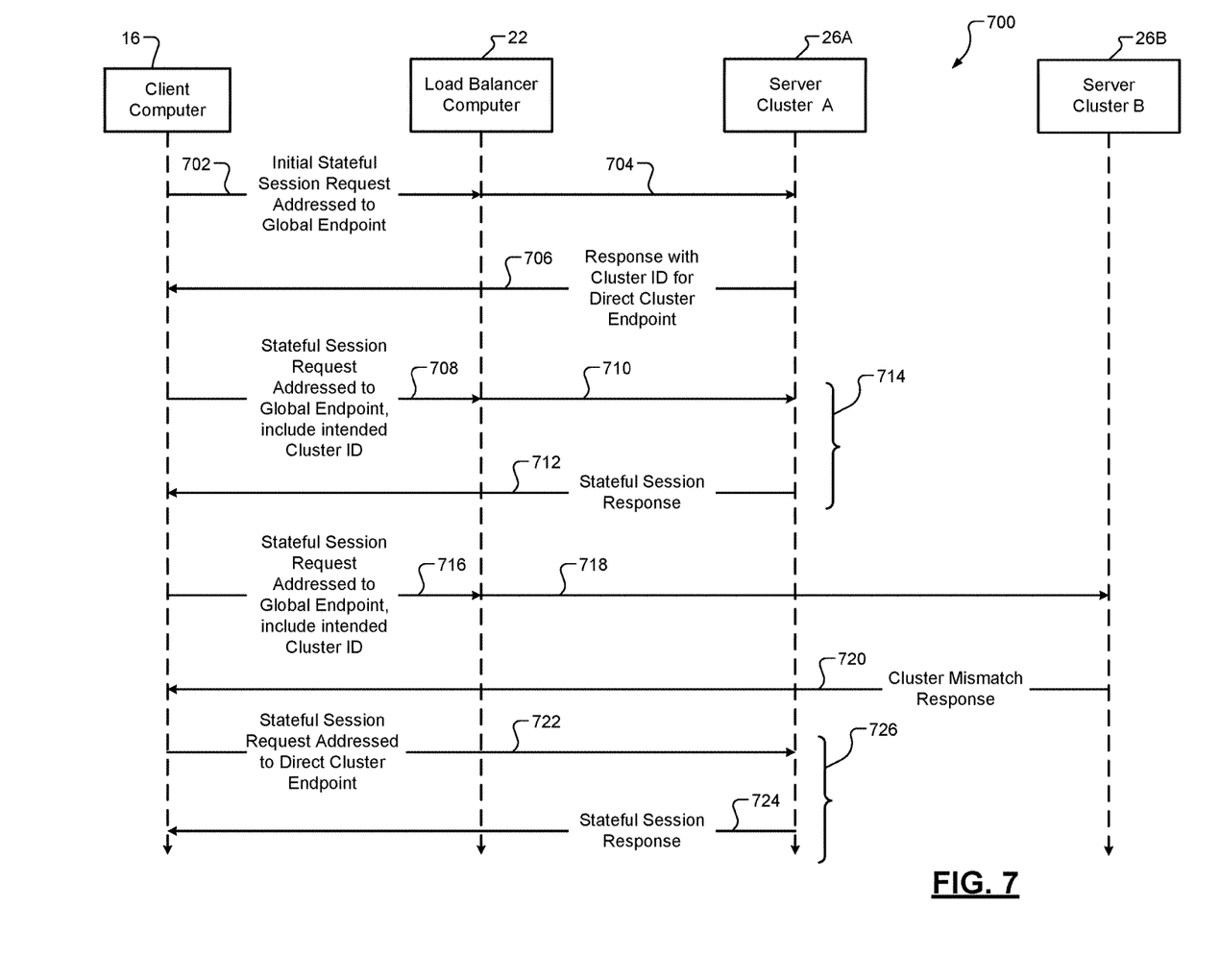
FIG. 7 illustrates a timing diagram of a stateful cloud services session in accordance with an embodiment of the present disclosure.

With reference to FIG. 7, an example timing diagram 700 of a stateful cloud services session is illustrated. Although the following operations are primarily described with respect to the implementations of FIGS. 1-3, the operations may be modified to apply to other implementations of the present disclosure. The operations may be iteratively performed.

In FIG. 7, communications between the client computer 16, the non-sticky load balancer computer 22, server cluster A 26A, and server cluster B 26B are shown.

At 702, the client computer sends an initial stateful session request addressed to the global endpoint. At 704, based on direction from the non-sticky load balancer computer 22, the request is directed to server cluster A 26A. At 706, a server computer 26 within server cluster A 26A sends a response to the initial stateful session request to the client computer 16. As discussed above, the response includes the cluster ID and/or the direct cluster endpoint address associated with the direct cluster endpoint that includes the server computer 26 responding to the initial request. As noted above, in some implementations, the cluster ID can be the same as the direct cluster endpoint address, in which case only a single value is returned in the response to the client.

At 708, the client computer sends a stateful session request addressed to the global endpoint and includes the intended cluster ID in the HTTP header of the request. At 710, based on direction from the non-sticky load balancer computer 22, the request is again directed to server cluster A 26A. The request is routed within the server cluster A 26A back to the same server computer 26 based on the session ID for the session. At 712, the server computer 26 within server cluster A 26A sends a stateful session response back to the client computer 16. The requests and responses grouped at 714 may, for example, be repeated a number of times, including, potentially, for the duration of the session.

At 716, the client computer 16 sends a stateful session request addressed to the global endpoint and again includes the intended cluster ID in the HTTP header of the request. At 718, this time, at the direction of the load balancer, the session request is directed to server cluster B 26B. As discussed above, a server computer 26 within server cluster B 26B compares the cluster ID from the HTTP header of the request with the direct cluster endpoint for server cluster B 26B and determines there is a cluster mismatch error. At 720, the server computer 26 within server cluster B then sends a cluster mismatch error response to the client computer 16.

At 722, the client computer 16 retries the previous request except addresses the request this time to the direct cluster endpoint for server cluster A 26A. As discussed above, the client computer 16 may already have the address for the direct cluster endpoint if it is the same as the cluster ID or if it was returned in the initial response from the server computer 26. In the event the client computer 16 does not have the address for the direct cluster endpoint, the client computer 16 can obtain the address for the direct cluster endpoint based on the cluster ID, as discussed above. The request is routed to server cluster A 26A and the server computer 26 within server cluster A associated with the session responds to the request with a stateful session response. The requests and responses grouped at 726 may, for example, be repeated a number of times, including, potentially, for the remainder of the session. As discussed above, the client computer 16 may address session requests to the direct cluster endpoint for server cluster A 26A for the remainder of the session. Alternatively, the client computer 16 may only address session requests to the direct cluster endpoint for server cluster A 26A for a predetermined period of time or for a predetermined number of requests. Alternatively, the client computer 16 may only retry the current request by addressing it to the direct cluster endpoint for server cluster A 26A and may then immediately begin to address session requests to the global endpoint address again by, for example, returning to 708.

The above-described operations of FIGS. 4-7 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A client device, comprising:
   one or more processors;
   memory in electronic communication with the one or more processors; and instructions stored in the memory and executable by the one or more processors to:
      initiate a stateful session for a web application configured to run in a web browser by sending, from the client device to a non-sticky load balancer, a session initiation request addressed to a global endpoint associated with the non-sticky load balancer configured to route requests to a plurality of server clusters, wherein the session initiation request is routed to a first server from a first server cluster via the non-sticky load balancer associated with the plurality of server clusters;
      receive a response to the session initiation request from the first server of the first server cluster of the plurality of server clusters, the response including a cluster identification associated with the first server cluster;
      send, from the client device to the non-sticky load balancer, a subsequent session request addressed to the global endpoint, the subsequent session request including the cluster identification associated with the first server cluster, wherein the subsequent session request is routed to a second server from a second server cluster via the non-sticky load balancer associated with the global endpoint;
      receive an error message in response to the subsequent session request from the second server of the second server cluster of the plurality of server clusters; and
      resend, from the client device to the first server of the first server cluster, the subsequent session request addressed to the cluster identification associated with the first server cluster, wherein resending the subsequent session request comprises bypassing the non-sticky load balancer in response to receiving the error message, and wherein the subsequent session request is addressed to the first server cluster after the web browser sends a cross-origin resource sharing (CORS) pre-flight request to the first server cluster.

2. The client device of claim 1, wherein the response to the session initiation request includes a direct cluster endpoint address corresponding to the first server cluster.

3. The client device of claim 1, wherein the cluster identification is a direct cluster endpoint address for the first server cluster.

4. The client device of claim 1, wherein the instructions are executable by the one or more processors to address additional session requests for the stateful session to the first server cluster in response to receiving the error message.

5. The client device of claim 1, wherein the non-sticky load balancer routes the subsequent session request to the second server using a similar traffic routing algorithm as used when routing the session initiation request to the first server.

6. The client device of claim 5, wherein the traffic routing algorithm includes an algorithm for routing traffic based on the global endpoint and independent from one or more cluster identifiers included within a given request.

7. The client device of claim 1, wherein the non-sticky load balancer does not store session state information associated with the stateful session for the application.

8. A server system associated with a plurality of server clusters, the plurality of server clusters being associated with a global endpoint, the server system comprising:
one or more processors;
memory in electronic communication with the one or more processors; and instructions stored in the memory and executable by the processor to:
receive, at a server from a non-sticky load balancer associated with the plurality of server clusters, a session initiation request originating from a client, the session initiation request being addressed to the global endpoint associated with the non-sticky load balancer, and wherein the session initiation request does not include a cluster identifier;
send, to the client from the server a response to the session initiation request to the client, the response including a first cluster identifier associated with a first server cluster corresponding to the server;
store session state information corresponding to a state of a client application;
receive, at the server from the non-sticky load balancer, a second session request originating from the client and addressed to the global endpoint, the second session request having an associated cluster identifier, wherein the non-sticky load balancer routes the second session request to a second server cluster using a similar traffic routing algorithm used when routing the session initiation request to the first server cluster, and wherein the traffic routing algorithm includes an algorithm for routing traffic based on the global endpoint and independent from one or more cluster identifiers included within a given request;
compare the associated cluster identifier with the first cluster identifier;
if the first cluster identifier does not match the associated cluster identifier, send, from the server to the client, a response to the client that includes an error message; and
if the first cluster identifier does match the associated cluster identifier, send, from the server to the client, a response to the client based on the stored session state information, the response causing the client device to resend the second session request based on the associated cluster identifier, wherein resending the second session request includes bypassing the non-sticky load balancer.

9. The server system of claim 8, wherein the client application is a web application configured to run in a web browser of the client.

10. The server system of claim 8, wherein the first cluster identification is a direct cluster endpoint address for the first server cluster.

11. The server system of claim 8, wherein the error message corresponds to a predetermined Hypertext Transfer Protocol (HTTP) status code.

12. The server system of claim 8, wherein the instructions are executable by the one or more processors to update the session state information stored in the memory to correspond to the state of the client application when the first cluster identification matches the second cluster identification.

13. A method comprising:
initiating, with a client, a stateful session for a web application configured to run in a web browser by sending, from the client to a non-sticky load balancer, a session initiation request addressed to a global endpoint associated with the non-sticky load balancer configured to route requests to a plurality of server clusters, wherein the session initiation request is routed to a first server from a first server cluster via the non-sticky load balancer associated with the plurality of node clusters;
receiving, with the client, a response to the session initiation request from the first server of the first server cluster of the plurality of server clusters, the response including a cluster identification associated with the first server cluster;
sending, from the client to the non-sticky load balancer, a subsequent session request addressed to the global endpoint, the subsequent session request including the cluster identification associated with the first server cluster, wherein the subsequent session request is routed to a second server from a second server cluster via the non-sticky load balancer associated with the global endpoint;
receiving, with the client, an error message in response to the subsequent session request from the second server of the second server cluster of the plurality of server clusters; and
resending, from the client to the first server of the first server cluster, the subsequent session request addressed to the cluster identification associated with the first server cluster, wherein resending the subsequent session request comprises bypassing the non-sticky load balancer in response to receiving the error message, and wherein the subsequent session request is addressed to the first server cluster after the web browser sends a cross-origin resource sharing (CORS) pre-flight request to the first server cluster.

14. The method of claim 13, wherein the response to the session initiation request includes a direct cluster endpoint address corresponding to the first server cluster.

15. The method of claim 13, further comprising sending all remaining session requests for the stateful session addressed to the first server cluster in response to receiving the error message.

16. The method of claim 13, wherein the non-sticky load balancer routes the subsequent session request to the second server using a similar traffic routing algorithm as used when routing the session initiation request to the first server and independent from the cluster identification included within the subsequent session request.

17. A method comprising:
storing, with a server associated with a first server cluster of a plurality of server clusters associated with a global endpoint, a first cluster identification associated with the first server cluster;
receiving, at the server from a non-sticky load balancer associated with a plurality of server clusters, a session initiation request originating from a client of a plurality of clients, the session initiation request being addressed to the global endpoint associated with the non-sticky load balancer, wherein the session initiation request does not include a specific cluster identifier, and wherein the global endpoint is associated with the plurality of server clusters;
sending, to the client from the server, a response to the session initiation request from the client, the response including a first cluster identifier associated with a first server cluster corresponding to the server;
storing, on the server, session state information corresponding to a state of a client application;
receiving, at the server from the non-sticky load balancer, a second session request from one of the plurality of clients addressed to the global endpoint, wherein the second session request includes an associated cluster identifier, wherein the non-sticky load balancer routes the second session request to a second server cluster using a similar traffic routing algorithm used when routing the session initiation request to the first server cluster, and wherein the traffic routing algorithm includes an algorithm for routing traffic based on the global endpoint and independent from one or more cluster identifiers included within a given request;
comparing the associated cluster identifier with the first cluster identifier;
if the first cluster identifier does not match the associated cluster identifier, send, from the server to the client, a response to the client that includes an error message; and
if the first cluster identifier does match the associated cluster identifier, send, from the server to the client, a response to the client based on the session state information stored on the server, the response causing the client device to resend the second session request based on the associated cluster identifier, wherein resending the second session request includes bypassing the non-sticky load balancer.

18. The method of claim 17, wherein the client application is a web application configured to run in a web browser of the client.

19. The method of claim 17,
wherein the first cluster identification is a first direct cluster endpoint address for the first server cluster; and
wherein the second cluster identification is a second direct cluster endpoint address for the second server cluster.

20. The method of claim 17, wherein the error message corresponds to a predetermined Hypertext Transfer Protocol (HTTP) status code.

21. The method of claim 17, further comprising updating the session state information, with the server, to correspond to the state of the client application when the first cluster identification matches the second cluster identification.

22. The method of claim 17, wherein the non-sticky load balancer routes the subsequent session request to the second server cluster using a similar traffic routing algorithm as used when routing the session initiation request to the first server cluster and independent from the cluster identification included within the subsequent session request.

* * * * *